(No Model.) 3 Sheets—Sheet 1.

W. R. TOBIAS,
CAMERA.

No. 435,080. Patented Aug. 26, 1890

Witnesses:
Raphaël Netter
Ernest Hopkinson

Inventor
William R Tobias
by Robt F. Gaylord
Attorney (No Model.) 3 Sheets—Sheet 2.

W. R. TOBIAS.
CAMERA.

No. 435,080. Patented Aug. 26, 1890.

Witnesses:
E. Hopkinson
F. B. Murphy

Inventor
William R. Tobias
By Robt. F. Gaylord
Attorney.

(No Model.) 3 Sheets—Sheet 3.

W. R. TOBIAS.
CAMERA.

No. 435,080. Patented Aug. 26, 1890.

Witnesses:
Ernest Hopkinson
J. B. Murphy

Inventor
William R Tobias
By Robt. F. Gaylord
Attorney

THE NORRIS PETERS CO., PHOTO-LITHO., WASHINGTON, D. C.

UNITED STATES PATENT OFFICE.

WILLIAM R. TOBIAS, OF PERTH AMBOY, NEW JERSEY.

CAMERA.

SPECIFICATION forming part of Letters Patent No. 435,080, dated August 26, 1890.

Application filed May 8, 1890. Serial No. 351,060. (No model.)

*To all whom it may concern:*

Be it known that I, WILLIAM R. TOBIAS, of Perth Amboy, in the county of Middlesex and State of New Jersey, have invented certain new and useful Improvements in Cameras, of which the following is a description, reference being had to the accompanying drawings.

The present invention relates particularly to the kind of cameras known as "detective-cameras," and the various features of improvement are essentially adapted to that kind of camera.

The objects of the invention are, first, to provide a detective-camera with a finder adapted to represent the same, or a part of the same, field of exposure and at the same focus as the main lens represents and to arrange the finder in such relation to the main lens as not to increase the size of the camera-box beyond that demanded for the main lens, and, second, the invention has for its object to provide a supplemental safety-shutter acting independently of the main shutter and automatically controlled by the adjustable portions of the box, so as to cover the main lens at all times, except when the box is adjusted to focus the main lens previous to exposure.

I will now describe the invention in detail and point out in the claims to follow the description the parts and combination of parts I regard as my invention.

Figure 1:
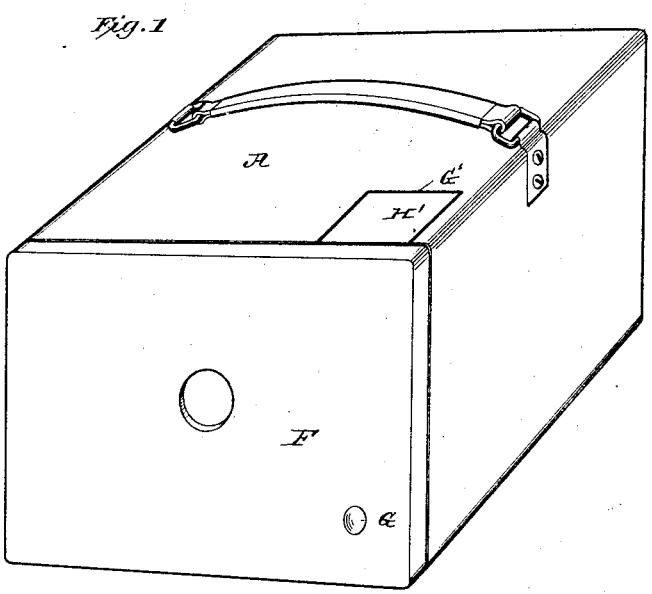
Figure 2:
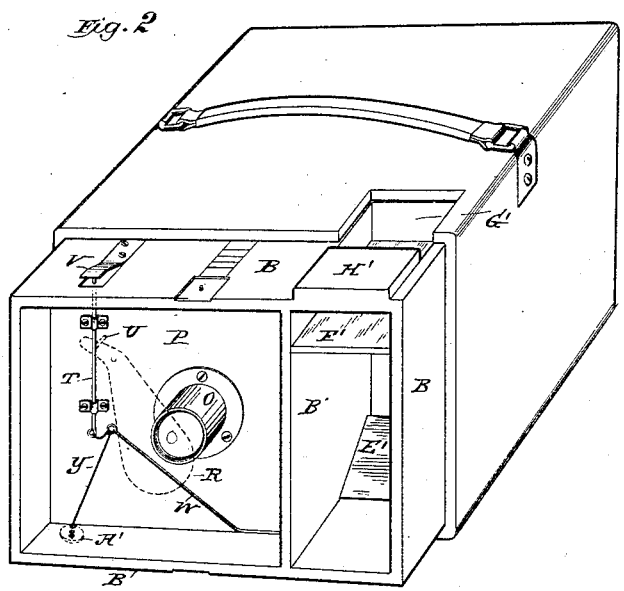
Figures 3, 4, 5:
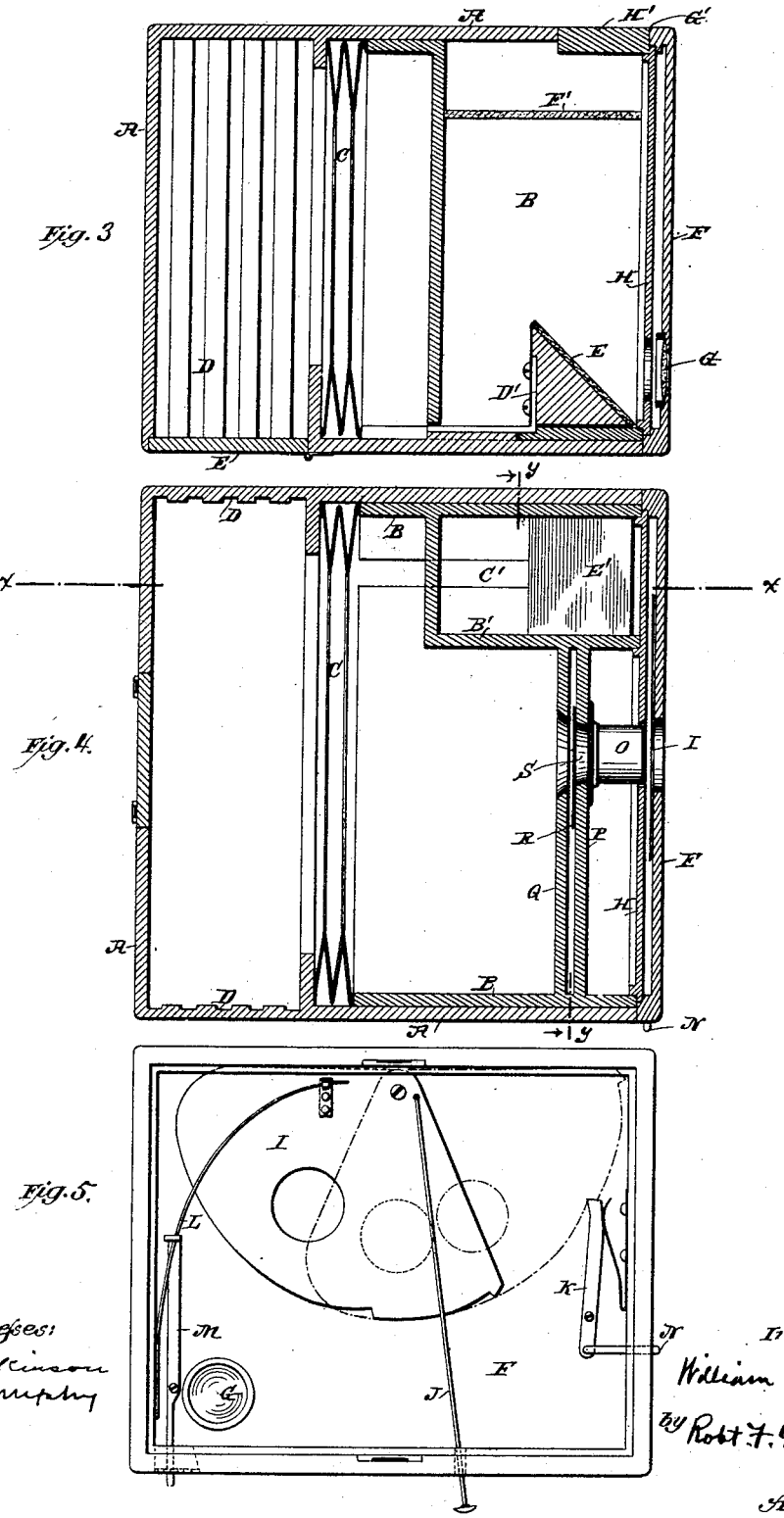
Figure 6:
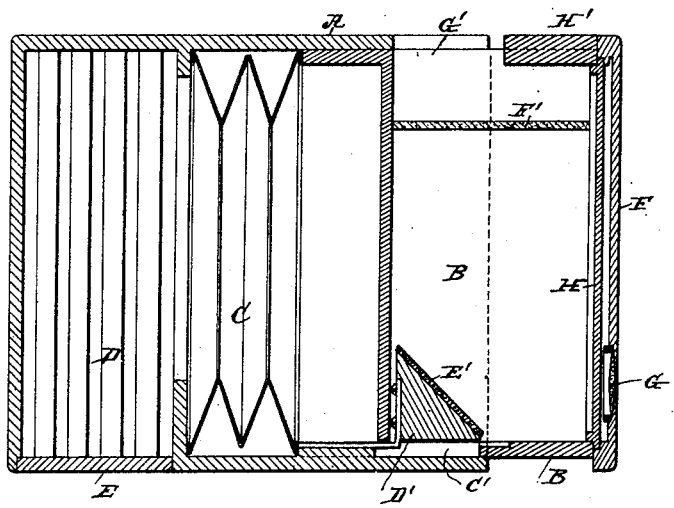
Figure 7:
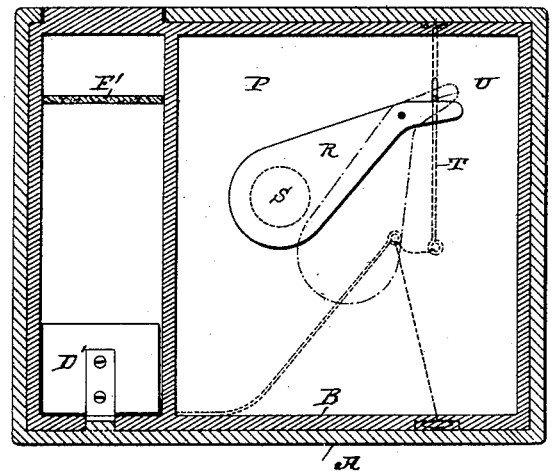

In the drawings, Figure 1 is a perspective view of my camera-box closed and as it appears when being carried or not in use. Fig. 2 is a like view, except that the inner box has been partially withdrawn from the outer box and the front (see Fig. 5) of this inner box has been removed to expose the finder-chamber and parts of the supplemental or safety shutter. Fig. 3 is a section of the camera-box on the plane x x of Fig. 4—that is, it is on a vertical plane through the finder-chamber, the box being closed. Fig. 4 is a horizontal section through the main lens. Fig. 5 is a view of the back side of the front. Fig. 6 is a section on the plane x x, Fig. 4, the inner box being withdrawn or adjusted to focus the main lens. Fig. 7 shows a cross vertical section on plane y y, Fig. 4, or back of the safety-shutter.

Referring to the views in detail, A represents the outer box of the camera, B is the inner box, and C is the bellows-folds that connect the two boxes.

D represents the grooves at the rear of the outer box, in which the plates or plate-carriers are inserted through the door E, though of course this space may be utilized to contain plates, films, or flexible negative roll-holders.

F is the front of the inner or sliding box, and this front is removably attached to the end of the box. It has an orifice in front of the main lens and carries the finder-lens G.

H is a removable partition behind the front F, which carries the instantaneous shutter I. (See particularly Fig. 5.) This shutter is operated by the push-rod J to set it on spring push-lever K, and is thrown by spring L, which is caused to act with varying tension by adjusting catch-lever M, set to bear with greater or less pressure upon the spring. After the shutter has been set, as seen in dotted lines, pushing in on the projecting pin N of push-lever K releases it to make the exposure.

O is the lens-tube, which is supported upon partition P, back of which is the partition Q, and between these partitions is located the supplemental or safety shutter R. (See Figs. 2 and 7.) This shutter is pivotally hung on partition P, and normally when free it falls away from behind the orifices back of the lens-tube.

T is a sliding rod, having a projection U, that extends over the short lever end of the shutter, and this rod extends through the top of the box B and bears against a leaf-spring V, secured to the top of the box, and the free end of which normally tends to spring away a short distance from the box, as when the box is withdrawn in the act of focusing; but when the box B is slid within the outer box the spring V is forced down flush with the top of box B, the rod T is pushed down, and the shutter R is caused to rise and cover the hole S. Thus it will be seen that the hole S is never uncovered except when the boxes are adjusted, or nearly so, to focus the main lens.

W is a spring arranged to one side of rod T and connected thereto by a flexible cord Y, which cord also extends to the button A', without the box B and in a depression therein.

When it is desired to make a time exposure, the instantaneous shutter will be set to uncover the lens, the button A' will be pulled out, thus holding the safety-shutter closed by rod T being held pulled down, the box will be focused, yielding on the cord Y will uncover the lens and expose the plate, and pulling out the cord again will cover the lens, after which the box may be partially closed to secure the shutter R, or the instantaneous shutter may be closed.

B' is a partition that, with the outer upright wall of the inner box B, forms the finder-chamber—that is, the chamber in which the rays from the finder-lens G find entrance. This chamber is entirely a part of and within the inner box B. Through the bottom of this chamber is an opening G', through which projects the support D', secured to the outer box A, and on this support and in front of the finder-lens is the mirror E'. This mirror is set at forty-five degrees to the path of the rays of light, so as to project the image formed upon the ground-glass plate F' set in the top of the finder-chamber. G' is an opening just over plate F and in the outer box, and H' is a corresponding block adapted to fit this opening and carried on the inner box B. This finder-chamber is set within the angle of divergence of the main lens with the sides of the box, and accordingly takes up no extra space. The deflecting-mirror is essential to so place this chamber and to bring the picture to the top of the outer box, whence it can be most readily seen by the operator through the opening G'. The focal length of the finder-lens is the same as that of the exposure-lens, and it will therefore be seen that in finding the object the operator also focuses the main lens on it through the finder-lens, the reflector behind the finder-lens being fixed, while the lens is adjustable toward and from it. By these means it will be seen that the object is found, adjusted on the plate, and focused through the finder, and while the plate is in condition for instantaneous exposure at the moment desired, and that the object may be kept in view and properly focused until after the exposure is effected; also, that the safety-shutter obviates the danger of second exposure or false exposure by the accidental handling of the camera while the main or instantaneous shutter is set or otherwise depended upon to protect the plate, and that such safety-shutter permits dispensing with slides before the plate, which have to be removed immediately before exposure, and which have to be in place when the shutter, if but one is used, is being set.

The features may obviously be variously modified, and I do not therefore confine myself to the precise forms and arrangements here shown and described.

What is claimed as new is—

1. The combination, in a detective-camera, of the boxes A and B, one sliding within the other to effect the focusing, an exposure-lens mounted upon the inner box, and a safety-shutter adapted to be opened by the act of adjusting the boxes and closed by the act of closing the boxes, substantially as set forth, and for the purpose described.

2. The combination, in a detective-camera, of the boxes A and B, one sliding within the other to effect the focusing, the exposure-lens, a shutter covering the lens, and a supplemental safety-shutter automatically brought to cover the lens by closing the said boxes and dropped to uncover the lens by adjusting the boxes, substantially as and for the purpose set forth.

3. The combination of the boxes A and B, the exposure-lens O, the shutter I, the safety-shutter R, and the rod T, extending to and bearing under the spring V, arranged between the boxes so as to be depressed when the boxes are closed and to raise when the boxes are opened, substantially as and for the purpose set forth.

4. In combination, the boxes A and B, sliding one within the other and the inner one carrying an exposure-lens, a finder-lens G of the same focal distance as the exposure-lens, and also carried on the inner box, a reflector E', opposite said finder-lens and secured to the outer box, and a focusing-plate F' for the finder-lens located above the reflector thereof and arranged to be viewed through the top of the boxes when the latter are adjusted, substantially as and for the purpose set forth.

WILLIAM R. TOBIAS.

Witnesses:
FRANK B. MURPHY,
THADDEUS W. ROLLE.